United States Patent [19]
Dutt

[11] Patent Number: 5,833,898
[45] Date of Patent: Nov. 10, 1998

[54] METHOD FOR MANUFACTURING RESIN-IMPREGNATED ENDLESS BELT STRUCTURES

[75] Inventor: William H. Dutt, Rensselaer, N.Y.

[73] Assignee: Albany International Corp., Albany, N.Y.

[21] Appl. No.: 728,322

[22] Filed: Oct. 10, 1996

[51] Int. Cl.$^6$ .............................. B29C 35/06; B29C 39/20
[52] U.S. Cl. ...................... 264/102; 264/156; 264/162; 264/163; 264/231; 264/250; 264/254; 264/255; 264/257; 264/310
[58] Field of Search ................................. 264/102, 231, 264/136, 137, 159, 162, 163, 156, 257, 310, 250, 255; 162/358.4, 902; 428/308.4, 225, 245

[56] References Cited

U.S. PATENT DOCUMENTS

| | | | |
|---|---|---|---|
| 3,138,962 | 6/1964 | Haines, Jr. et al. | 74/231 |
| 3,200,180 | 8/1965 | Russ et al. | 264/102 |
| 4,053,547 | 10/1977 | Redmond, Jr. | 264/102 |
| 4,157,752 | 6/1979 | Sick et al. | 264/136 |
| 4,443,396 | 4/1984 | Breher | 264/136 |
| 4,946,731 | 8/1990 | Dutt | 428/156 |
| 5,134,010 | 7/1992 | Schiel | 428/113 |
| 5,208,087 | 5/1993 | Stigberg | 428/60 |
| 5,219,505 | 6/1993 | Kaiser | 264/138 |
| 5,234,551 | 8/1993 | Dutt et al. | 162/358.4 |
| 5,238,537 | 8/1993 | Dutt | 162/358.4 |
| 5,525,194 | 6/1996 | Jermo | 162/358.4 |
| 5,601,877 | 2/1997 | Miller et al. | 162/902 |

*Primary Examiner*—Jan H. Silbaugh
*Assistant Examiner*—Mark Eashoo
*Attorney, Agent, or Firm*—Kane, Dalsimer, Sullivan, Kurucz, Levy, Eisele and Richard, LLP

[57] ABSTRACT

A method for manufacturing a resin-impregnated endless belt structure is carried out on an apparatus having an outer cylinder having an inner cylindrical surface coaxial with a smaller radius cylindrical mandrel. An endless base structure for the endless belt structure is disposed within the outer cylinder on the inner cylindrical surface. The cylindrical mandrel, having an inwardly curved nose, is then inserted into the outer cylinder forming a nip of converging geometry between the nose and the inner cylindrical surface. Polymeric resin material is dispensed continuously into the nip while the cylindrical mandrel is gradually moved completely into the outer cylinder. The nose forces the polymeric resin material into the endless base structure, and air bubbles out, while forcing the endless base structure against the inner cylindrical surface. After the polymeric resin material is cured, the endless belt structure, having a totally impregnated, air-bubble free endless base structure with a coating on its inner surface, may be obtained upon removal from the apparatus.

24 Claims, 12 Drawing Sheets

METHOD FOR MANUFACTURING RESIN-IMPREGNATED ENDLESS BELT STRUCTURES

BACKGROUND OF THE INVENTION

1. Field of the Invention

The present invention relates to mechanisms for extracting water from a web of material, and more particularly from a fibrous web being processed into a paper product on a papermaking machine. Specifically, the present invention is a method for manufacturing resin-impregnated endless belt structures designed for use on a long nip press of the shoe type on a papermaking machine, and for other papermaking and paper-processing applications, and the belt structures manufactured in accordance with the method.

2. Description of the Prior Art

During the papermaking process, a fibrous web of cellulosic fibers is formed on a forming wire by depositing a fibrous slurry thereon in the forming section of a papermachine. A large amount of water is drained from the slurry in the forming section, after which the newly formed web is conducted to a press section. The press section includes a series of press nips, in which the fibrous web is subjected to compressive forces applied to remove water therefrom. The web finally is conducted to a drying section which includes heated dryer drums around which the web is directed. The heated dryer drums reduce the water content of the web to a desirable level through evaporation to yield a paper product.

Rising energy costs have made it increasingly desirable to remove as much water as possible from the web prior to its entering the dryer section. As the dryer drums are often heated from within by steam, costs associated with steam production can be substantial, especially when a large amount of water needs to be removed from the web.

Traditionally, press sections have included a series of nips formed by pairs of adjacent cylindrical press rolls. In recent years, the use of long press nips of the shoe type has been found to be more advantageous than the use of nips formed by pairs of adjacent press rolls. This is because the longer the time a web can be subjected to pressure in the nip, the more water can be removed there, and, consequently, the less water will remain behind in the web for removal through evaporation in the dryer is section.

The present invention relates to long nip presses of the shoe type. In this variety of long nip press, the nip is formed between a cylindrical press roll and an arcuate pressure shoe. The latter has a cylindrically concave surface having a radius of curvature close to that of the cylindrical press roll. When the roll and shoe are brought into close physical proximity to one another, a nip which can be five to ten times longer in the machine direction than one formed between two press rolls is formed. Since the long nip is five to ten times longer than that in a conventional two-roll press, the so-called dwell time of the fibrous web in the long nip is correspondingly longer under the same level of pressure per square inch in pressing force used in a two-roll press. The result of this new long nip technology has been a dramatic increase in dewatering of the fibrous web in the long nip when compared to conventional nips on paper machines.

A long nip press of the shoe type requires a special belt, such as that shown in U.S. Pat. No. 5,238,537. This belt is designed to protect the press fabric supporting, carrying and dewatering the fibrous web from the accelerated wear that would result from direct, sliding contact over the stationary pressure shoe. Such a belt must be provided with a smooth, impervious surface that rides, or slides, over the stationary shoe on a lubricating film of oil. The belt moves through the nip at roughly the same speed as the press fabric, thereby subjecting the press fabric to minimal amounts of rubbing against the surface of the belt.

Belts of the variety shown in U.S. Pat. No. 5,238,537 are made by impregnating a woven base fabric, which takes the form of an endless loop, with a synthetic polymeric resin. Preferably, the resin forms a coating of some predetermined thickness at least on the inner surface of the belt, so that the yarns from which the base fabric is woven may be protected from direct contact with the arcuate pressure shoe component of the long nip press. It is specifically this coating which must have a smooth, impervious surface to slide readily over the lubricated shoe and to prevent any of the lubricating oil from penetrating the structure of the belt to contaminate the press fabric, or fabrics, and fibrous web.

The base fabric of the belt shown in U.S. Pat. No. 5,238,537 may be woven from monofilament yarns in a single- or multi-layer weave, and is woven so as to be sufficiently open to allow the impregnating material to totally impregnate the weave. This eliminates the possibility of any voids forming in the final belt. Such voids may allow the lubrication used between the belt and shoe to pass through the belt and contaminate the press fabric or fabrics and fibrous web. The base fabric may be flat-woven, and subsequently seamed into endless form, or woven endless in tubular form.

When the impregnating material is cured to a solid condition, it is primarily bound to the base fabric by a mechanical interlock, wherein the cured impregnating material surrounds the yarns of the base fabric. In addition, there may be some chemical bonding or adhesion between the cured impregnating material and the material of the yarns of the base fabric.

Long nip press belts, such as that shown in U.S. Pat. No. 5,238,537, depending on the size requirements of the long nip presses on which they are installed, have lengths from roughly 10 to 40 feet (approximately 3 to 12 meters), measured longitudinally around their endless-loop forms, and widths from roughly 100 to 450 inches (approximately 250 to 1125 centimeters), measured transversely across those forms. It will be appreciated that the manufacture of such belts is complicated by the requirement that the base fabric be endless prior to its impregnation with a synthetic polymeric resin.

Nevertheless, belts of this variety have been successfully manufactured for some years. However, two lingering problems remain in the manufacturing process.

Firstly, it remains difficult to remove all of the air from the base fabric during the impregnation and coating process. As implied above, air remaining in the woven structure of the base fabric manifests itself as voids in the final belt product. Such voids may allow the lubrication used between the belt and the arcuate pressure shoe to pass through the belt and contaminate the press fabric or fabrics and fibrous web. As a consequence, it is important to get all air out of the base fabric to achieve its complete impregnation by the synthetic polymeric resin being used.

Secondly, it remains difficult to provide the inner surface of the belt with a layer of synthetic polymeric resin without inverting the belt (turning it inside out) at some point during the manufacturing process. It will be appreciated that belts of the dimensions given above are not readily turned inside out, and that the act of doing so places a great strain on the impregnating and coating material, often leaving weak spots which may develop into full-fledged holes through the belt. Accordingly, the widely used technique of providing a layer of polymeric resin material on the outside of the belt, and inverting of the belt to place the layer on the inside, has not yielded consistently satisfactory results.

The present invention provides a solution to these problems, which characterize prior-art methods for manufacturing resin-impregnated endless belt structures, by ensuring that air is forced out of the endless base fabric during its impregnation by a polymeric resin material, and by providing a layer of the polymeric resin material on the inner surface of the belt without having to turn the belt inside out at any time during the manufacturing process.

SUMMARY OF THE INVENTION

Accordingly, in its broadest form, the present invention is a method for manufacturing a resin-impregnated endless belt structure wherein an endless base structure is totally impregnated with a polymeric resin material. During the impregnation, all air is removed from the endless base structure. The endless belt structure produced by the method has a coating of polymeric resin material on its inner surface. The method makes it unnecessary to invert (turn inside out) the endless belt structure, or its endless base structure, at any time during the manufacturing process.

The practice of the method is begun by providing an endless base structure, such as a woven, knitted, spiral or braided base fabric, having a length, measured therearound, equal to that desired for the endless belt structure. The width of the endless base structure should be at least equal to that desired for the endless belt structure and, preferably, should be somewhat wider.

The endless base structure is impregnated and coated with the polymeric resin material using an apparatus which includes an outer cylinder having an inner cylindrical surface with a circumference at least equal to the length of the endless base structure. The outer cylinder has a height at least equal to the width desired for the endless belt structure. The endless base structure is disposed within the outer cylinder on the inner cylindrical surface thereof. Preferably, the endless base structure is attached, or anchored, to each end of the outer cylinder, and placed under tension in the direction of the axis thereof.

A cylindrical mandrel, coaxial with the outer cylinder and having a smaller radius than the inner cylindrical surface thereof, is also part of the apparatus. The cylindrical mandrel has an inwardly curved nose.

The cylindrical mandrel is inserted, nose first, into the outer cylinder. The nose of the cylindrical mandrel forms a nip with the inner cylindrical surface of the outer cylinder. A polymeric resin material, specifically, a solvent-free 100%-solids resin composition, is then dispensed into the nip, and, more specifically, between the nose of the cylindrical mandrel and the endless base structure.

The cylindrical mandrel is then moved completely into the outer cylinder while the polymeric resin material is dispensed into the nip. The nose of the cylindrical mandrel provides a converging geometry with the inner cylindrical surface of the outer cylinder. As the cylindrical mandrel moves into the outer cylinder, the nose forces the polymeric resin material into the endless base structure, forces air out of the endless base structure and outward in the direction of motion of the cylindrical mandrel, and forces the endless base structure toward the inner cylindrical surface. After the polymeric resin material has been cured, an endless belt structure, totally impregnated with the polymeric resin material and lacking internal air bubbles, and having a coating of the resin material on its inner surface, may be removed from the apparatus. The endless belt structure has a thickness equal to the difference between the radii of the cylindrical mandrel and the inner cylindrical surface of the outer cylinder.

The present method may be used to manufacture resin-impregnated endless belt structures for use in all phases of the papermaking industry. That is to say, the endless belt structures may be used as roll covers, and calender belts, as well as on long nip presses of the shoe type.

The several embodiments of the present invention will now be described in more complete detail. In the description, frequent reference will be made to the drawing figures identified immediately below.

DETAILED DESCRIPTION OF THE PREFERRED EMBODIMENTS

Figure 1:
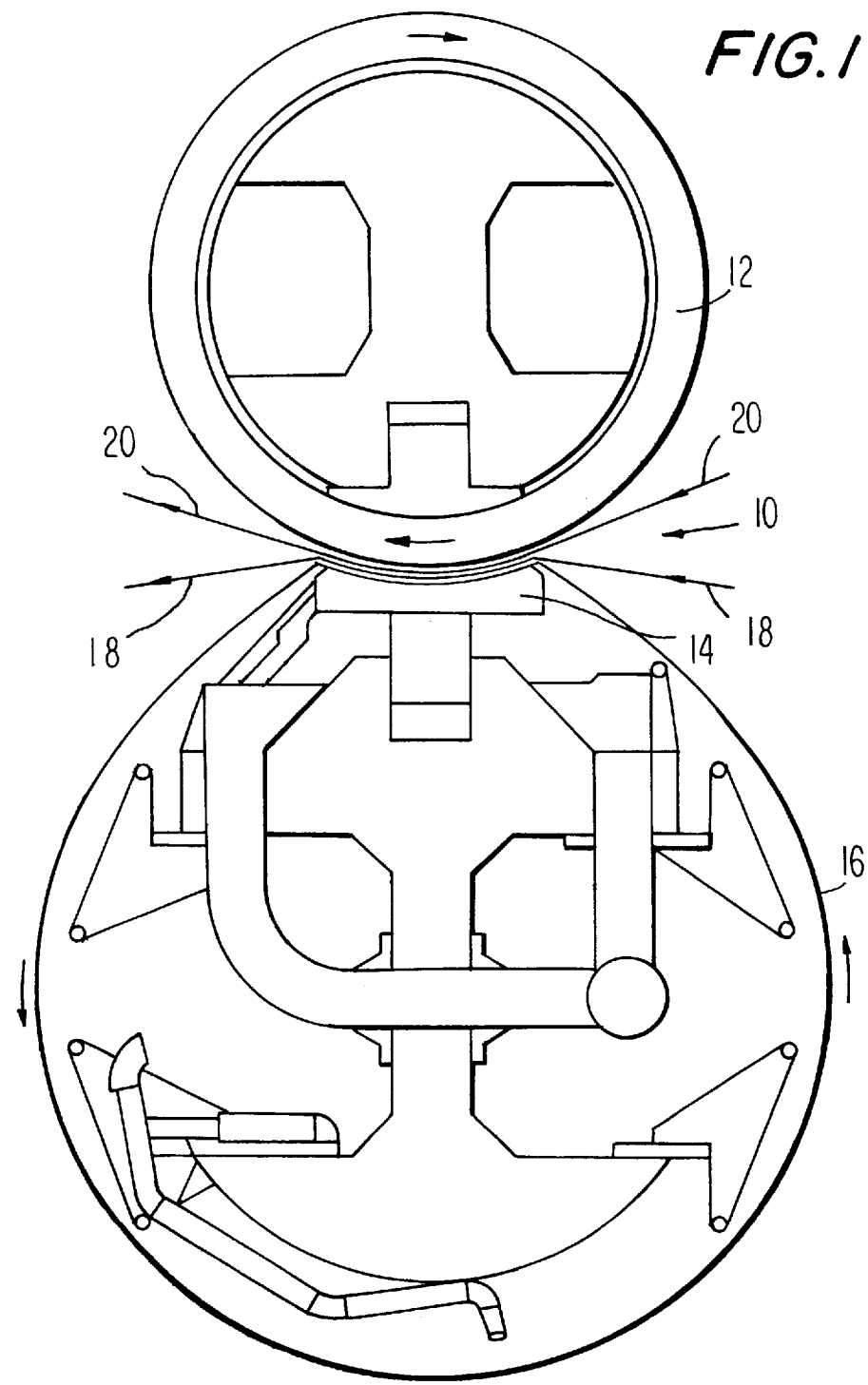
FIG. 1 is a side cross-sectional view of a long nip press.

A long nip press for dewatering a fibrous web being processed into a paper product on a paper machine is shown in a side cross-sectional view in FIG. 1. The press nip 10 is defined by a smooth cylindrical press roll 12 and an arcuate pressure shoe 14. The arcuate pressure shoe 14 has about the same radius of curvature as the cylindrical press roll 12. The distance between the cylindrical press roll 12 and the arcuate pressure shoe 14 may be adjusted by hydraulic means operatively attached to arcuate pressure shoe 14 to control the loading of the nip 10. Smooth cylindrical press roll 12 may be a controlled crown roll matched to the arcuate pressure shoe 14 to obtain a level cross-machine nip profile.

Endless belt structure 16 extends in a closed loop through nip 10, separating press roll 12 from arcuate pressure shoe 14. A wet press fabric 18 and a fibrous web 20 being processed into a paper sheet pass together through nip 10 as indicated by the arrows in FIG. 1. Fibrous web 20 is supported by wet press fabric 18 and comes into direct contact with smooth cylindrical press roll 12 in nip 10. Fibrous web 20 and wet press fabric 18 proceed through the nip 10 as indicated by the arrows. Endless belt structure 16, also moving through press nip 10 as indicated by the arrows, that is, counter-clockwise as depicted in FIG. 1, protects wet press fabric 18 from direct sliding contact against arcuate pressure shoe 14, and slides thereover on a lubricating film of oil. Endless belt structure 16, accordingly, must be impermeable to oil, so that wet press fabric 18 and fibrous web 20 will not be contaminated thereby.

Figure 2:
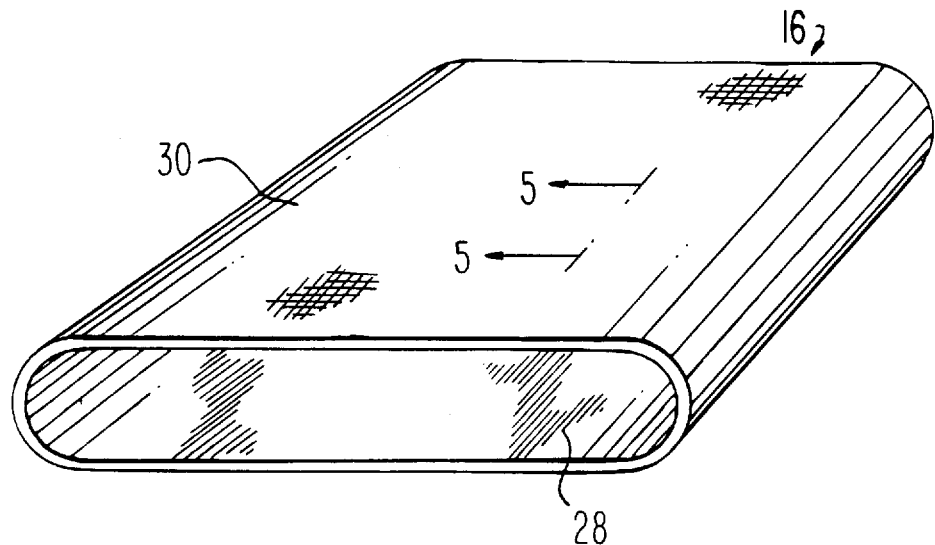
FIG. 2 is a perspective view of a belt made in accordance with the method of the present invention.

A perspective view of belt 16 is provided in FIG. 2. The belt 16 has an inner surface 28 and an outer surface 30. On the outer surface 30, the woven base of the belt 16 may be visible.

Figure 3:
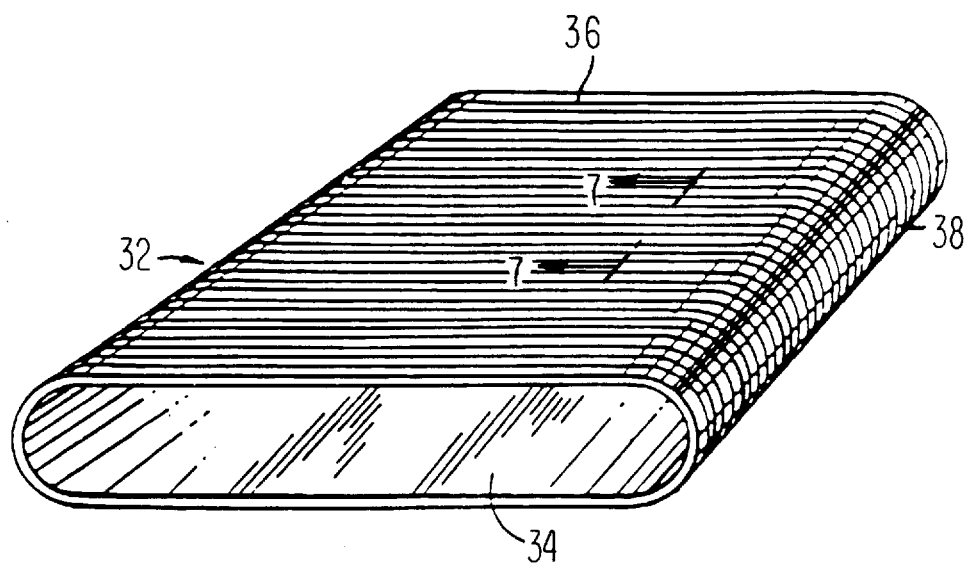
FIG. 3 is a perspective view of an alternate embodiment of the belt.

FIG. 3 is a perspective view of an alternate embodiment of the belt 32. The belt 32 has an inner surface 34 and an outer surface 36. The outer surface 36 is provided with a plurality of grooves 38, for example, in the longitudinal direction around the belt 32 for the temporary storage of water pressed from fibrous web 20 in press nip 10.

Figure 4:
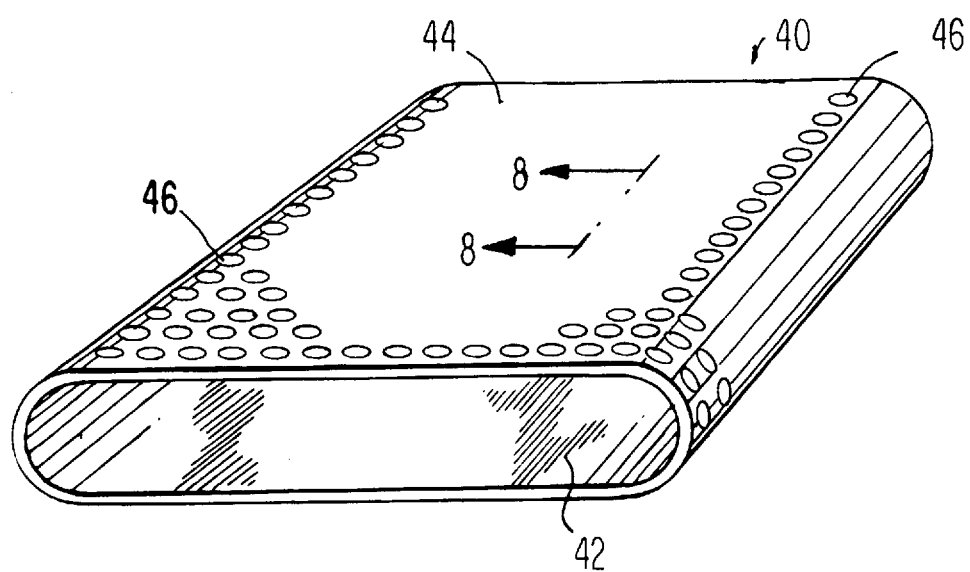
FIG. 4 is a perspective view of another embodiment of the belt.

Alternatively, the outer surface of the belt may be provided with a plurality of blind holes arranged in some desired geometric pattern for the temporary storage of water. FIG. 4 is a perspective view of such an alternate embodiment of the belt 40. The belt 40 has an inner surface 42 and an outer surface 44. The outer surface 44 is provided with a plurality of blind holes 46, so called because they do not extend completely through the belt 40.

Figure 5:
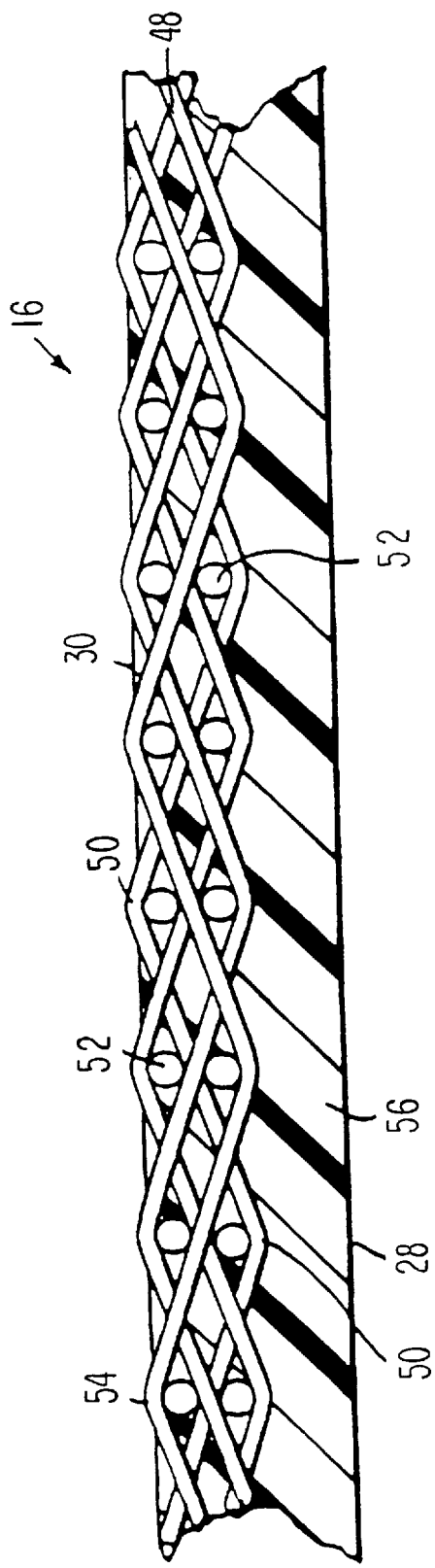
FIG. 5 is a cross-sectional view of the belt taken as indicated by line 5–5 in FIG. 2.

FIG. 5 is a cross section of belt 16 taken as indicated by line 5—5 in FIG. 2. The cross section is taken in the transverse, or cross-machine, direction of belt 16, and shows that belt 16 includes a base fabric 48. The base fabric 48 is woven from transverse, or cross-machine direction, yarns 50, seen from the side in FIG. 5, and longitudinal, or machine-direction, yarns 52, seen in cross section in FIG. 5. Base fabric 48 is illustrated as having been woven endless, the transverse yarns 50 being depicted as warp yarns weaving over, under and between the stacked pairs of longitudinal yarns 52, the weft yarns in the endless weaving process in a duplex weave. It should be understood, however, that base fabric 48 may be flat woven, and subsequently joined into endless form with a seam. It should be further understood that base fabric 48 may be woven in a single-layer weave, or in any other weave which may be used in the production of papermachine clothing. It may also be a braided, knitted or spiral structure. In any case, knuckles 54 formed where the warp yarns weave over the weft yarns, and specifically in FIG. 5 where transverse yarns 50 weave over longitudinal yarns 52, may be visible on the outer surface 30 of the belt 16. The inner surface 28 of the belt 16 (that is, the shoe side) is formed by a polymeric resin coating 56. The polymeric resin also impregnates the base fabric 48, and renders the belt 16 impervious to oil and water. The polymeric resin coating 56 may be of polyurethane, and preferably is a 100% solids composition thereof. The use of 100% solid resin system, which by definition lacks a solvent material, enables one to avoid the formation of bubbles in the polymeric resin during the curing process through which it proceeds following its application onto the base fabric.

It may often be desirable to have a polymeric resin coating on both sides of the base fabric of a belt of this kind to ensure that the neutral axis of bending of the belt coincides with the base fabric. Where this is the case, the repeated flexing of the belt as it passes around guide rolls and the like on a papermachine is less likely to cause the polymeric resin coating to break away and delaminate from the base fabric. Further, any polymeric resin coating on the outside of the belt (that is, the felt side) may be provided with grooves, blind holes, indentations or the like in some geometric pattern to provide a sink for the temporary storage of water pressed from fibrous web 20 in the press nip 10.

Figure 6:
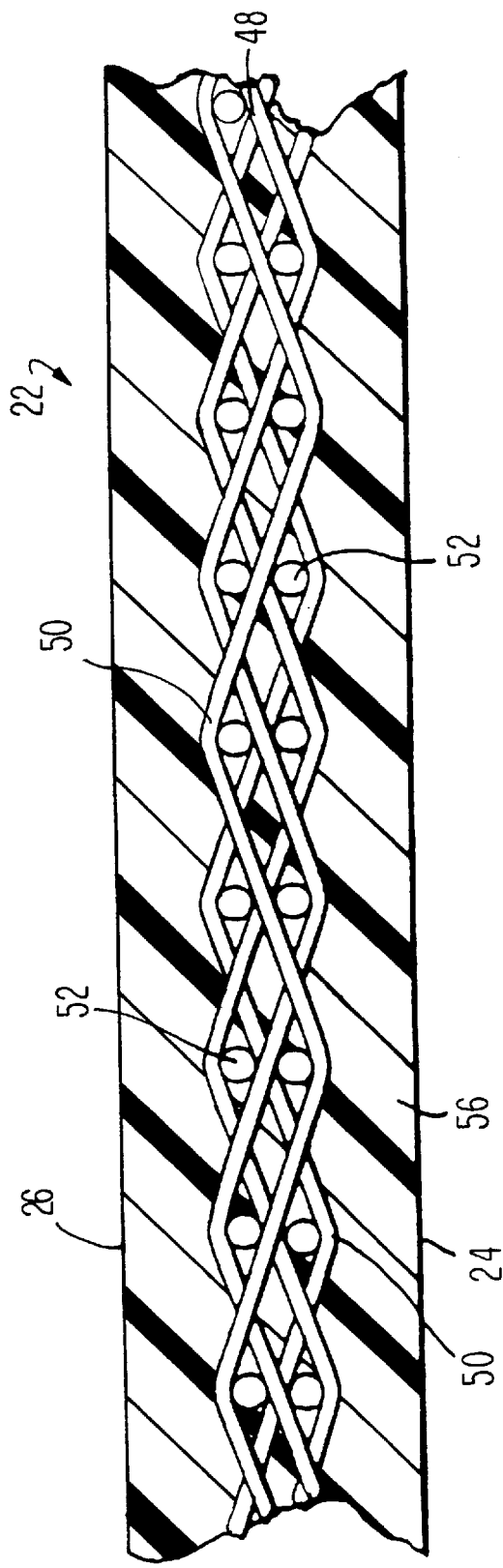
FIG. 6 is a cross-sectional view, analogous to that given in FIG. 5, for a belt having a coating on both sides.

In this regard, FIG. 6 is a cross-sectional view, analogous to that given in FIG. 5, for a belt 22 having a polymeric resin coating on both sides of its base fabric. Belt 22 includes base fabric 48 woven from transverse yarns 50 and longitudinal yarns 52 in an endless weaving process. Both the inner surface 24 and the outer surface 26 of the belt 22 (that is, both the shoe and felt sides, respectively) are formed by a polymeric resin coating 56. As before, the polymeric resin impregnates the base fabric 48, and renders the belt 22 impervious to oil and water. Both the inner surface 24 and the outer surface 26 of the belt 22 are smooth.

Figure 7:
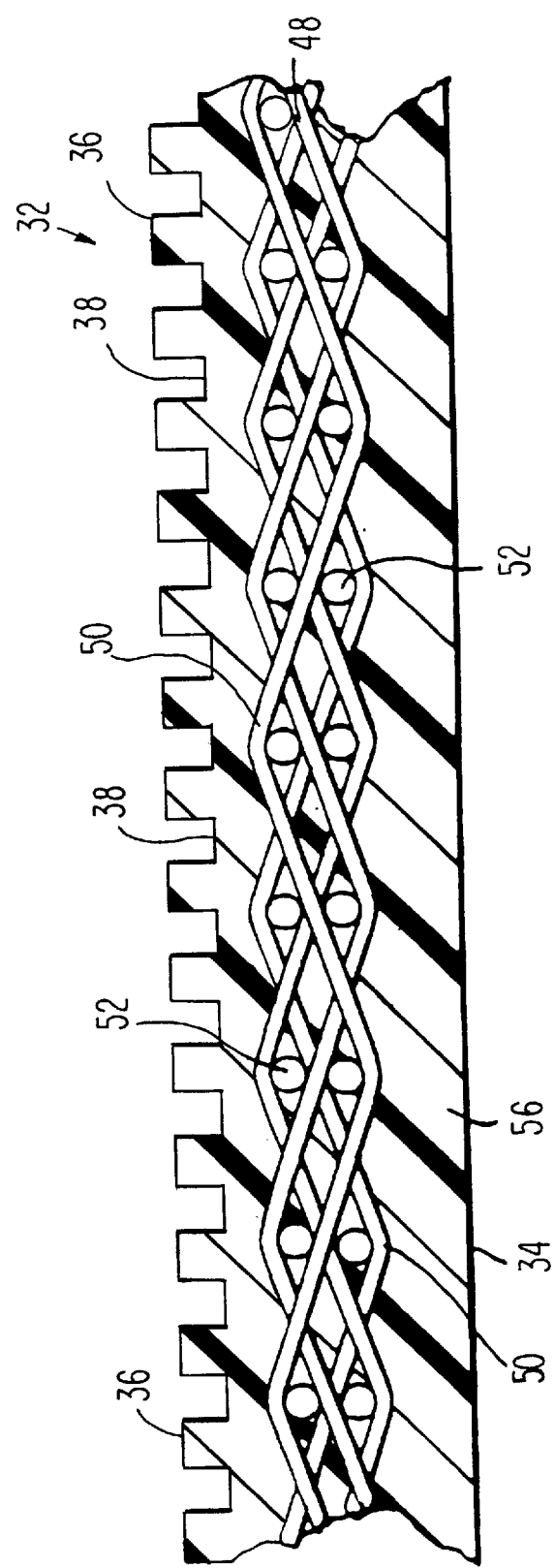
FIG. 7 is a cross-sectional view of the belt taken as indicated by line 7—7 in FIG. 3.

FIG. 7 is a cross section of belt 32 taken as indicated by line 7—7 in FIG. 3. Belt 32 also includes base fabric 48 woven from transverse yarns 50 and longitudinal yarns 52 in an endless weaving process. Both the inner surface 34 and the outer surface 36 of the belt 32 (that is, both the shoe and felt sides, respectively) are formed by a polymeric resin coating 56. As before, the polymeric resin impregnates the base fabric 48, and renders the belt 32 impervious to oil and water. After the polymeric resin has been cured, the grooves 38 may be cut into the outer surface 36 of the belt 32.

Figure 8:
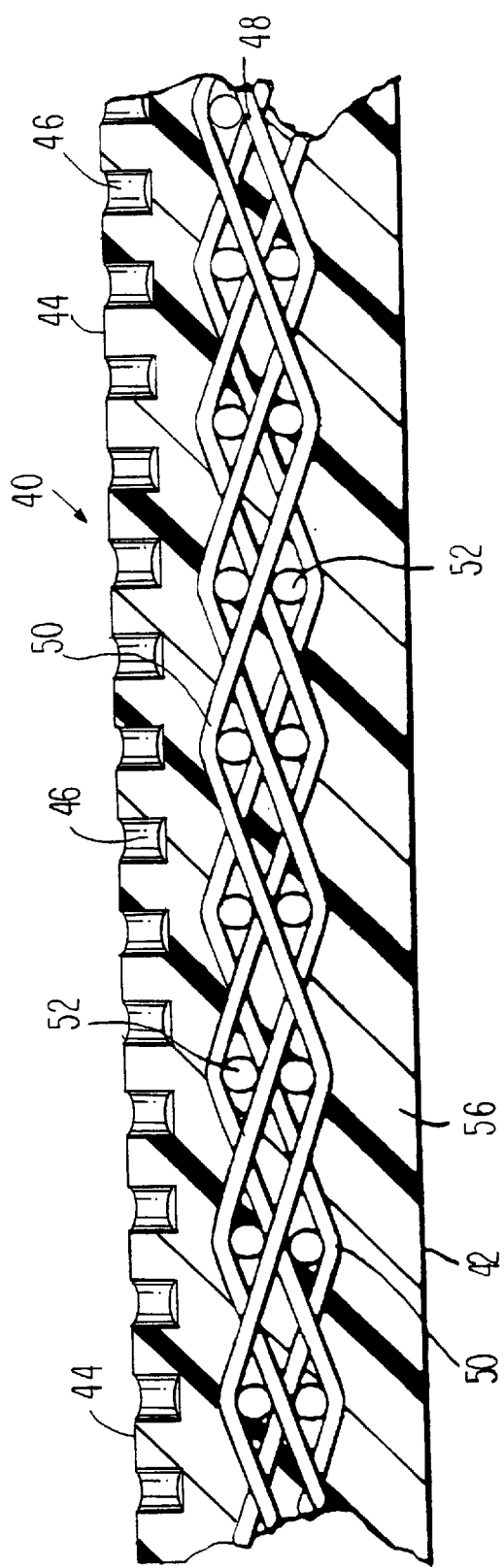
FIG. 8 is a cross-sectional view of the belt taken as indicated by line 8—8 in FIG. 4.

Similarly, FIG. 8 is a cross section of belt 40 taken as indicated by line 8—8 in FIG. 4. Belt 40 also includes base fabric 48 woven from transverse yarns 50 and longitudinal yarns 52 in an endless weaving process. Both the inner surface 42 and the outer surface 44 of the belt 40 (that is, both the shoe and felt sides, respectively) are formed by a polymeric resin coating 56. As previously, the polymeric resin impregnates the base fabric 48, and renders the belt 40 impervious to oil and water. After the polymeric resin has been cured, the blind holes 46 may be drilled into the outer surface 44 of the belt.

As noted earlier, two long-standing problems complicate the manufacture of belts of the foregoing variety. Firstly, it remains difficult to remove all of the air from the base fabric during the impregnation and coating process. That is to say, complete impregnation has remained a goal long-sought, but unachieved, in the coating and impregnation processes of the prior art. And secondly, it has remained difficult to provide the inner surface of the belt with a layer of synthetic polymeric resin without inverting the endless base fabric or belt at some time during the manufacturing process. The present invention provides the long-sought solution to both of these problems.

Figure 9:
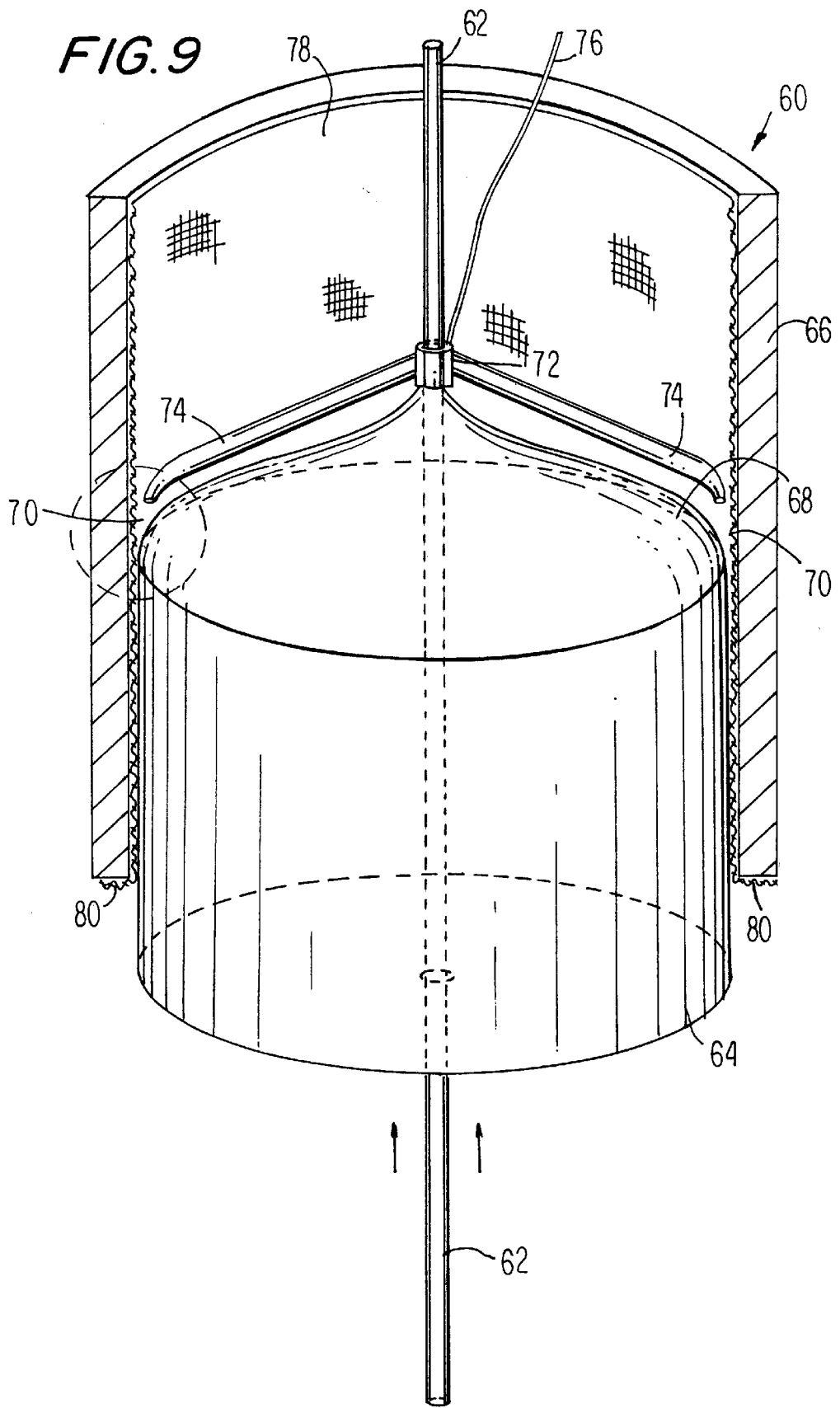
FIG. 9 is a perspective, partially sectioned view of an apparatus for use in practicing the method of the present invention.

FIG. 9 is a perspective, partially sectioned view of an apparatus for use in practicing the method of the present invention. The apparatus 60 comprises a center guide shaft 62 with a cylindrical mandrel 64 disposed and axially movable thereon. The center guide shaft 62 is centered with respect to the surface of the cylindrical mandrel 64, coincides with the axis thereof, and is oriented vertically.

The apparatus 60 also includes an outer cylinder 66, partially sectioned in FIG. 9. The outer cylinder 66 has an inner cylindrical surface, the center guide shaft 62 also being centered with respect to this inner cylindrical surface and coinciding with the axis thereof. Outer cylinder 66, as well as cylindrical mandrel 64, may have smooth, polished surfaces.

Cylindrical mandrel 64 is designed to be movable along center guide shaft 62, and, having a smaller radius than outer cylinder 66, to be disposable therewithin. As cylindrical mandrel 64 and outer cylinder 66 are coaxial on center guide shaft 62, a uniformly thick space, having a thickness equal to the difference between the radius of the cylindrical mandrel 64 and the radius of the outer cylinder 66, separates the cylindrical mandrel 64 and the outer cylinder 66 when the former is within the latter. Outer cylinder 66 is at least as long as cylindrical mandrel 64, so that cylindrical mandrel 64 may be completely disposed within the outer cylinder 66.

Cylindrical mandrel 64 has a curved nose 68, which forms a converging geometry with outer cylinder 66 and defines a nip 70 therebetween.

Outer cylinder 66 may be an integral structure, or may comprise two halves bolted together and readily separable from one another.

Above curved nose 68, and displaceable along center guide shaft 62 therewith, is a polymeric resin distribution manifold 72. The manifold 72 may comprise one or more nozzles 74 for depositing a polymeric resin material into the nip 70. The polymeric resin distribution manifold 72 may take any one of a number of forms, all of which are adapted to provide a polymeric resin material to the nip 70 continuously about the circumference thereof. For example, the manifold 72 may have a single or double nozzle 74, as shown in FIG. 9. Preferably, if this is the case, the nozzle or nozzles 74 are rotatable about the center guide shaft 62 to provide a continuous supply of polymeric resin material completely about the circumference of the nip 70. Alternatively, instead of individual nozzles 74, the polymeric resin distribution manifold 72 could include a stationary ring disposed above the nip 70 and having multiple outlets, provided at fixed angular intervals thereabout. In any event, the exact manner in which the polymeric resin distribution manifold 72 supplies polymeric resin material to the nip 70 is less important than the requirement that the distribution be uniform.

It will be noted that a conduit 76 supplies the polymeric resin material to the distribution manifold 72 from some appropriate reservoir.

The apparatus 60 may also include a cover, not shown in FIG. 9, and a vacuum pump, so that the volume within the outer cylinder 66 and above the curved nose 68 may be placed under a negative pressure, that is, a pressure below that outside the outer cylinder 66, to facilitate the removal of air bubbles from the polymeric resin material.

Having thus described the apparatus 60, we turn now to the method by which a base fabric may be coated and impregnated with a polymeric resin material to provide a belt of the variety shown in FIGS. 2 and 5. More generally, the method to be first described is suitable for placing a coating of a polymeric resin material on the inside of an endless base fabric or on the inside of a previously coated belt.

Firstly, one provides an endless base fabric 78, either woven endless or flat-woven and seamed into endless form, having a length equal to that desired for the finished belt and a width somewhat greater than that desired for the finished belt. It should be understood that, instead of endless base fabric 78, the base could be any other form of endless substrate used by those in the industry.

The base fabric 78 is then disposed within an outer cylinder 66 having a circumference at least equal to the length of the base fabric 78, and, preferably, a smooth, polished surface. The base fabric 78 may be attached, or anchored, to the bottom of the outer cylinder 66 at points 80, and, alternatively or in addition, may be attached at points along the top of the outer cylinder. Base fabric 78 may be placed under tension axially with respect to outer cylinder 66.

The cylindrical mandrel 64 is then moved upward along center guide shaft 62 into outer cylinder 66. Once the nose 68 and cylindrical mandrel 64 are within the outer cylinder 66 an amount sufficient to form nip 70, polymeric resin material is dispensed from nozzle 74.

Figure 10:
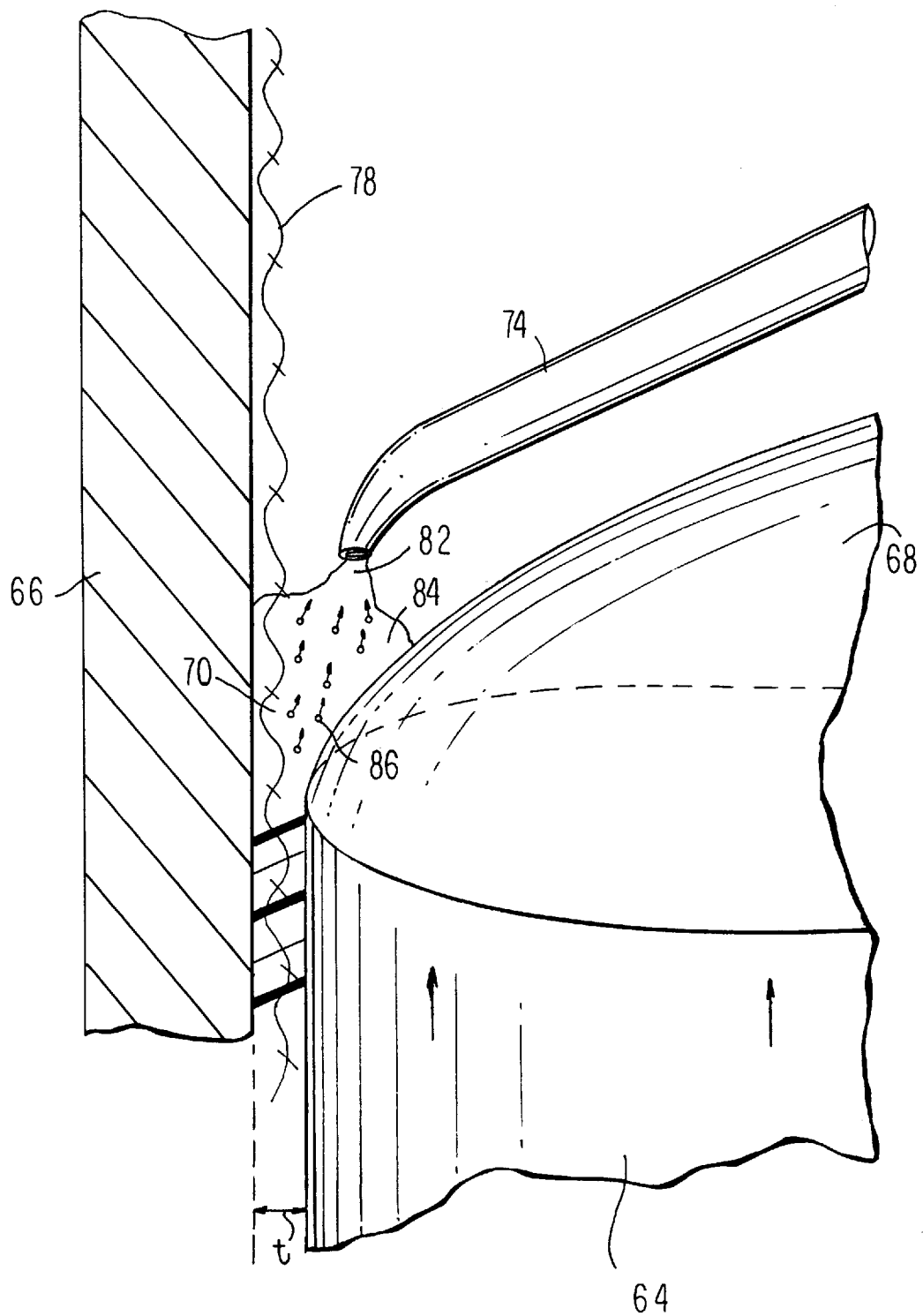
FIG. 10 is an enlarged view of the circled area in FIG. 9.

FIG. 10 is an enlarged view of the circled area in FIG. 9. Polymeric resin material 82 forms a pool 84 in nip 70 when dispensed from nozzle 74. The upward motion of nose 68 and cylindrical mandrel 64 generates hydrostatic forces which drive the polymeric resin material 82 into the base fabric 78, which drive the base fabric 78 toward the outer cylinder 66, and which drive the air, in the form of bubbles 86, out of the base fabric 78 and pool 84. Bubbles 86 migrate to the top of the pool 84 under the influence of gravity and because of the vertical orientation of apparatus 60. The upward migration and removal of bubbles 86 can be facilitated by placing the interior of the outer cylinder 66 under a slight vacuum, as discussed above.

The process illustrated in FIG. 10 proceeds until cylindrical mandrel 64 is completely within outer cylinder 66, yielding a belt, like those shown in FIGS. 2 and 5, of thickness t equal to the separation between cylindrical mandrel 64 and outer cylinder 66, that separation being the difference between the radii thereof.

At this point, before the removal of the belt from the apparatus 60, the polymeric resin material 82 may be totally cured. Then, the belt, still on the cylindrical mandrel 64, may be removed from the outer cylinder 66, preferably by using an outer cylinder separable into segments. Finally, the belt may be removed from cylindrical mandrel 64 according to any one of the conventional techniques used by those skilled in the art for this purpose, such as by supplying compressed air into the interface between the belt and the cylindrical mandrel 64.

Alternatively, before the removal of the belt from the apparatus 60, the polymeric resin material 82 may be only partially cured, that is, B-staged or green staged, to leave bonding sites for additional coating material on either side (inside or outside) of the belt.

If an additional coating layer on the inside of the belt is desired, the belt is removed from the cylindrical mandrel 64, and redisposed within the outer cylinder 66, as above. Then a new cylindrical mandrel 64 of smaller radius than that previously used is disposed on center guide shaft 62, and the inside of the belt coated according to the process previously described. Once the additional coating layer of polymeric resin material 82 has been applied across the width of the belt, that is, when cylindrical mandrel 64 is completely within outer cylinder 66, the coating may be totally cured, or partially cured, where an additional coating layer or layers is to be applied to either side of the belt. In either event, it will again be necessary to remove the belt from the cylindrical mandrel 64.

As mentioned above, it may be desirable to place a layer of polymeric resin material 82 on the outside of the belt, as well as on the inside, to ensure that the belt's neutral axis of bending coincides with the base fabric. Where such a layer is provided, it may be provided with grooves, blind holes, indentations or the like to provide for the temporary storage of water pressed from fibrous web 20 in the press nip 10.

Figure 11:
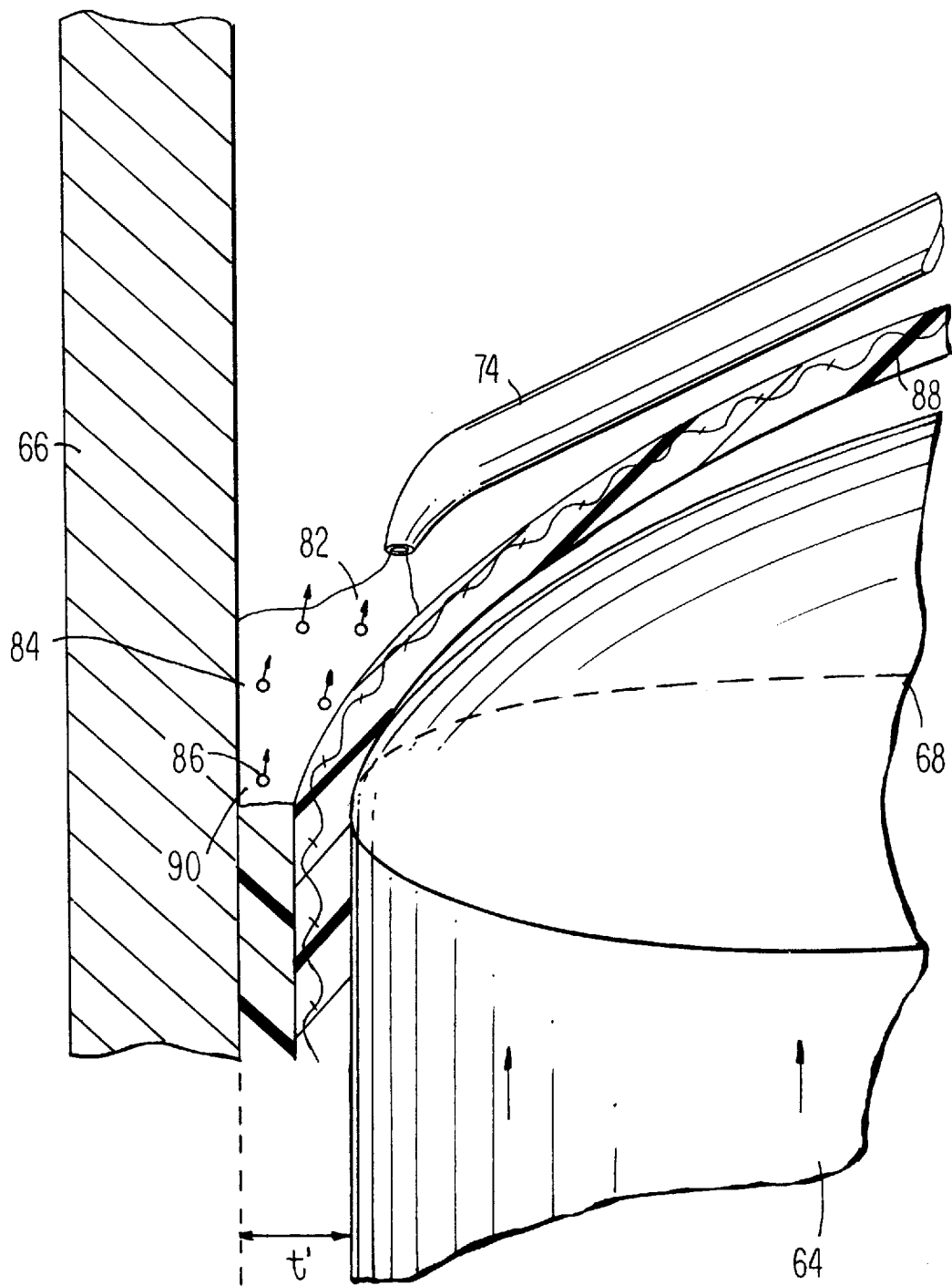
FIG. 11 is a view, analogous to that provided in FIG. 10, for the situation where a coating is being applied to the outside of a previously coated belt structure.

FIG. 11 is a view, analogous to that provided in FIG. 10, for the situation where a coating is being applied to the outside of a previously coated belt structure.

Belt 88 in FIG. 11 is one having at least one layer of polymeric resin material on its inside and having a totally impregnated base fabric. It is disposed on an outer cylinder 66 of slightly greater radius than that used during the coating of its inside, and attached or anchored to the bottom of outer cylinder 66 at points 80, as shown in FIG. 9. Belt 88 is then bunched up over nose 68 and beneath nozzles 74, so that nozzles 74 may deposit polymeric resin material 82 in a pool 84 between outer cylinder 66 and the outside of belt 88, where a nip 90 is formed therebetween. Cylindrical mandrel 64, having a radius equal to that used to provide the coating on the inside of belt 88, or having a radius equal to the last one used if more than one coating layer has been applied to the inside of the belt 88, is then forced upward into belt 88 and outer cylinder 66 to carry out the coating process in a manner similar to that previously described. Hydrostatic forces, generated by the upward motion of nose 68 and cylindrical mandrel 64, drive the air, which may be trapped in the pool 84 of polymeric resin material 82 in the form of bubbles 86, upward and out of the pool 84.

As before, bubbles 86 migrate to the top of pool 84 under the influence of gravity and because of the vertical orientation of apparatus 60, and the upward migration and removal of bubbles 86 can be facilitated by placing the interior of the outer cylinder 66 under a slight vacuum, as discussed above.

The process illustrated in FIG. 11 proceeds until cylindrical mandrel 64 is completely within outer cylinder 66, yielding a belt of thickness t, equal to the separation between cylindrical mandrel 64 and outer cylinder 66, that separation being the difference between the radii thereof.

At this point, before the removal of belt 88 from apparatus 60, the polymeric resin material may be totally cured. Then, the belt 88, still on cylindrical mandrel 64, may be removed from outer cylinder 66. With belt 88 still on cylindrical mandrel 64, grooves 38, blind holes 46, as shown in FIGS. 3, 4, 7 and 8, or some other indentations or surface features may be provided on the outside thereof by graving, drilling or the like.

Figure 12:
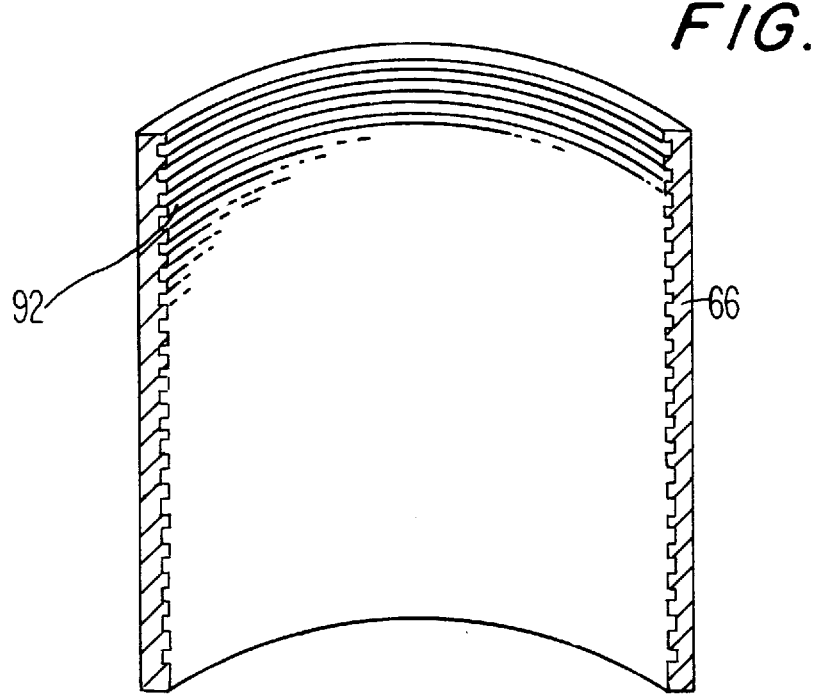
FIG. 12 is a perspective view of the inner surface of an outer cylinder of the apparatus of FIG. 9 having circumferential grooves.
Figure 13:
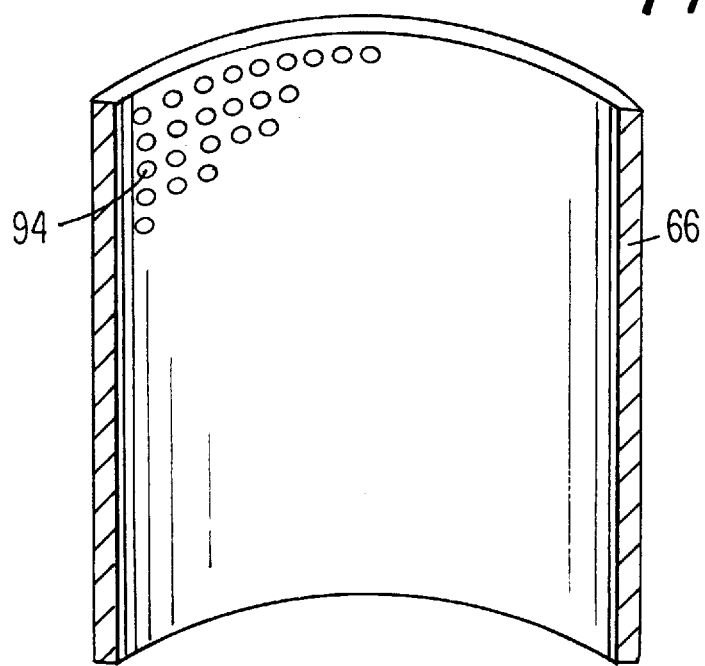
FIG. 13 is a perspective view of the inner surface of an outer cylinder of the apparatus of FIG. 9 having a plurality of cylindrical projecting numbers.

Alternatively, these surface features may be provided on the outside surface of belt 88 by using an outer cylinder 66 having corresponding features on its inner cylindrical surface in the final coating step for the outside of the belt 88. For example, as shown in FIG. 12, outer cylinder 66 may have an inner surface having circumferential grooves 92 which will ultimately mold grooves 38 in the outer surface 36 of belt 32 of FIGS. 3 and 7. Further, as shown in FIG. 13, outer cylinder 66 may have an inner surface having a plurality of cylindrical members 94 which will ultimately mold blind holes 46 in the outer surface 44 of belt 40 of FIGS. 4 and 8. Either feature, circumferential grooves 92 or cylindrical members 94 may also be provided by lining the outer cylinder 66, that is, by covering the inner surface of outer cylinder 66, with a liner bearing the appropriate surface characteristics.

Figure 14:
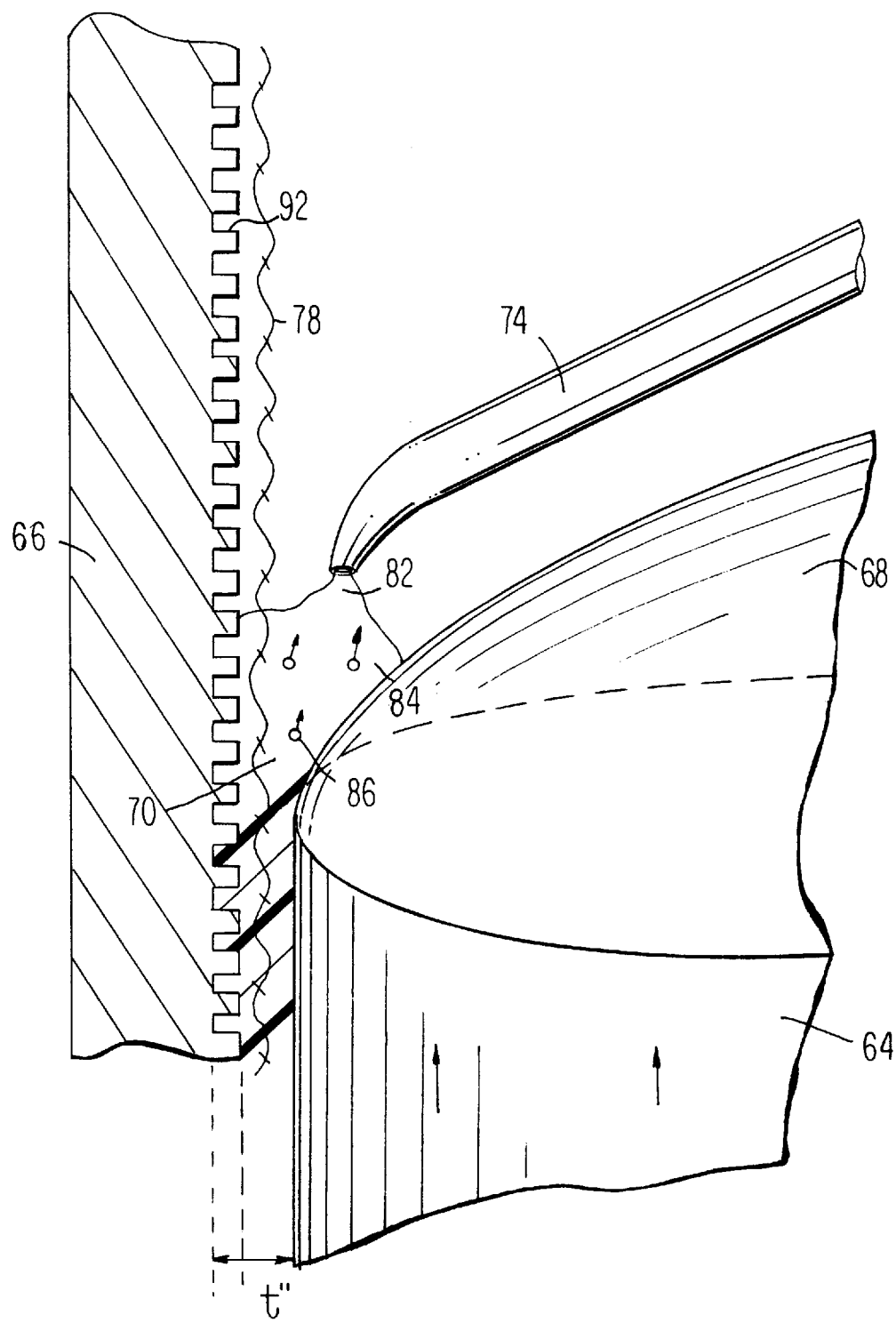
FIG. 14 is a view, analogous to that provided in FIG. 10, for the situation where an outer cylinder having a grooved inner surface is being used in the apparatus shown in FIG. 9.

FIG. 14 is a view, analogous to that provided in FIG. 10, for the situation where the outer cylinder 66 has an inner surface with circumferential grooves 92. Polymeric resin material 82 forms a pool 84 in nip 70 when dispensed from nozzle 74. Again, the upward motion of nose 68 and cylindrical mandrel 64 generates hydrostatic forces which drive the polymeric resin material 82 into the base fabric 78 and into circumferential grooves 92, which drive the base fabric 78 toward the outer cylinder 66, and which drive the air, in the form of bubbles 86, out of the base fabric 78 and pool 84.

As before, bubbles 86 migrate to the top of pool 84 under the influence of gravity and because of the vertical orientation of apparatus 60, and the upward migration and removal of bubbles 86 can be facilitated by placing the interior of the outer cylinder 66 under a slight vacuum, as discussed above.

The process illustrated in FIG. 14 proceeds until cylindrical mandrel 64 is completely within outer cylinder 66, yielding a belt of overall thickness t" equal to the separation between cylindrical mandrel 64 and the bottoms of circumferential grooves 92, and with grooves of a depth equal to that of circumferential grooves 92. The polymeric resin material 82 is cured, and the outer cylinder 66 separated into segments to remove the newly produced belt on cylindrical mandrel 64.

Finally, the belt may be removed from cylindrical mandrel 64 according to any one of the conventional techniques used by those skilled in the art for this purpose.

Alternatively, before the removal of the belt 88 from the apparatus 60, the polymeric resin material 82 may be only partially cured, to leave bonding sites for additional coating material on either side of the belt. Total curing should only be effected when no further layers of coating material (polymeric resin material 82) are to be applied to either side of the belt, as, at such time, there would be no further need to preserve bonding sites for additional coating layers. An additional coating layer may be provided on the outside of the belt 88, and the additional coating layer provided with surface features, such as grooves or blind holes, in one of the manners just described.

When the belt has been built up to its final desired thickness following the total impregnation of the base fabric with the polymeric resin material and the provision of a coating layer or layers on the inside or both sides thereof, the polymeric resin material is totally cured. Then the belt, still on cylindrical mandrel 64, is removed from outer cylinder 66. While still on cylindrical mandrel 64, grooves 38, blind holes 46 or the like may be provided on the outside of the belt, if they have not already been provided by corresponding features on the inside cylindrical surface of the outer cylinder 66. In addition, the outside of the belt may also be ground to provide it with a uniform thickness and a particular surface finish. Finally, the edges of the belt may be trimmed to remove peripheral, unimpregnated portions of the base fabric, and to provide the belt with a final desired width.

The method just described achieves the intended goals of total impregnation of the base fabric with the polymeric resin material being used and the removal of all air from the structure thereof. In addition, the method enables one to provide the inner surface of the belt with a layer of polymeric resin material without having to invert the belt at any time during the manufacturing process.

The removal of all air from the structure of the base fabric is facilitated by the vertical orientation of apparatus 60, and by the use of a cover on the outer cylinder 66, and a vacuum pump to reduce the air pressure within the outer cylinder 66. The reduction in air pressure draws the air bubbles out of the polymeric resin material. The apparatus 60 may, however, be disposed horizontally, but, if so disposed, must be rotated about center guide shaft 62 to insure that pool 84 of polymeric resin material 82 remains uniformly distributed about the circumference of nip 70 and does not pool at the bottom of the horizontally disposed apparatus 60.

The resins used as polymeric resin material 82 are preferably of the reactive type, either chemically cross-linked with a catalyst or cross-linked with the application of heat. Resins having a 100% solids composition, that is, lacking a solvent, are preferred, as solvents tend to generate bubbles during the curing process. Polyurethane resins having 100% solids compositions are preferred. It should be understood, for example, that the two sides of the belt may be coated with the same or a different 100% solids resin composition, and that there is no requirement that both sides of the belt be coated with a single type of 100% solids resin composition.

Because the polymeric resin material 82 will tend to stick to the cylindrical mandrel 64, it may be desirable to provide the cylindrical mandrel 64 with a sleeve or coating which would enable it to slide more readily with respect to the inside of the coated belt. The sleeve or coating would also make it easier to remove the coated belt from the cylindrical mandrel 64 at the appropriate time. Polyethylene or tetrafluoroethylene (TEFLON®) may be used as the coating or sleeve.

Modifications to the above would be obvious to those of ordinary skill in the art, but would not bring the invention so modified beyond the scope of the appended claims.

What is claimed is:

1. A method for manufacturing a resin-impregnated endless belt structure comprising the steps of:
    a) providing an endless base structure for said endless belt structure, said endless base structure having a length measured therearound and a width thereacross, said width being at least equal to that desired for said endless belt structure;
    b) providing a first outer cylinder having an inner cylindrical surface, said inner cylindrical surface having a circumference at least equal to said length of said endless base structure and a height at least equal to the width desired for said endless belt structure;
    c) disposing said endless base structure on said inner cylindrical surface of said first outer cylinder;
    d) providing a first cylindrical mandrel coaxial with said inner cylindrical surface of said first outer cylinder, said first cylindrical mandrel having a smaller radius than said inner cylindrical surface, said first cylindrical mandrel having an inwardly curved nose at an end thereof;
    e) moving said nose of said first cylindrical mandrel into said first outer cylinder, said nose of said first cylindrical mandrel providing a converging geometry with said inner cylindrical surface of said first outer cylinder;
    f) dispensing a first polymeric resin material into a nip formed between said endless base structure on said inner cylindrical surface and said nose of said first cylindrical mandrel;
    g) moving said first cylindrical mandrel completely into said first outer cylinder while dispensing said first polymeric resin material into said nip, said nose of said first cylindrical mandrel forcing said first polymeric resin material into said endless base structure, forcing air out of said endless base structure, and forcing said endless base structure toward said inner cylindrical surface of said first outer cylinder;
    h) completely curing said first polymeric resin material;
    i) removing said endless belt structure, comprising said endless base structure and said completely cured first polymeric resin material, and said first cylindrical mandrel from said first outer cylinder; and
    j) removing said endless belt structure from said first cylindrical mandrel.

2. The method as claimed in claim 1 further comprising the steps of:
    a) providing a cover for said first outer cylinder;
    b) providing a vacuum pump for evacuating air through an opening in said cover from the interior of said first outer cylinder; and
    c) evacuating air from said first outer cylinder while said step of moving said first cylindrical mandrel completely into said first outer cylinder while dispensing said first polymeric resin material into said nip is being carried out.

3. The method as claimed in claim 1 further comprising the step of attaching said endless base structure about an entrance to said first outer cylinder.

4. The method as claimed in claim 1 further comprising the step of attaching said endless base structure to a first end and a second end of said first outer cylinder.

5. The method as claimed in claim 4 further comprising the step of placing said endless base structure under tension between said first and second ends of said first outer cylinder.

6. The method as claimed in claim 1 wherein said first outer cylinder and said first cylindrical mandrel are oriented in a vertical direction.

7. The method as claimed in claim 1 wherein said first outer cylinder and said first cylindrical mandrel are oriented in a horizontal direction and are spun about a horizontal axis while said step of moving said first cylindrical mandrel completely into said first outer cylinder while dispensing said first polymeric resin material into said nip is being carried out.

8. The method as claimed in claim 1 wherein said inner cylindrical surface of said first outer cylinder has surface features designed to impart corresponding features into said first polymeric material.

9. A method for manufacturing a resin-impregnated endless belt structure comprising the steps of:
    a) providing an endless base structure for said endless belt structure, said endless base structure having a length measured therearound and a width thereacross, said width being at least equal to that desired for said endless belt structure;
    b) providing a first outer cylinder having an inner cylindrical surface, said inner cylindrical surface having a circumference at least equal to said length of said endless base structure and a height at least equal to the width desired for said endless belt structure;
    c) disposing said endless base structure on said inner cylindrical surface of said first outer cylinder;
    d) providing a first cylindrical mandrel coaxial with said inner cylindrical surface of said first outer cylinder, said first cylindrical mandrel having a smaller radius than said inner cylindrical surface, said first cylindrical mandrel having an inwardly curved nose at an end thereof;
    e) moving said nose of said first cylindrical mandrel into said first outer cylinder, said nose of said first cylindrical mandrel providing a converging geometry with said inner cylindrical surface of said first outer cylinder;
    f) dispensing a first polymeric resin material into a nip formed between said endless base structure on said inner cylindrical surface and said nose of said first cylindrical mandrel;

g) moving said first cylindrical mandrel completely into said first outer cylinder while dispensing said first polymeric resin material into said nip, said nose of said first cylindrical mandrel forcing said first polymeric resin material into said endless base structure, forcing air out of said endless base structure, and forcing said endless base structure toward said inner cylindrical surface of said first outer cylinder;

h) partially curing said first polymeric resin material;

i) removing said endless belt structure, comprising said endless base structure and said partially cured first polymeric resin material, and said first cylindrical mandrel from said first outer cylinder;

j) removing said endless belt structure from said first cylindrical mandrel;

k) disposing said endless belt structure on said inner cylindrical surface of said first outer cylinder;

l) providing a second cylindrical mandrel coaxial with said inner cylindrical surface of said first outer cylinder, said second cylindrical mandrel having a smaller radius than said first cylindrical mandrel, said second cylindrical mandrel also having an inwardly curved nose at an end thereof;

m) moving said nose of said second cylindrical mandrel into said first outer cylinder, said nose of said second cylindrical mandrel providing a converging geometry with said inner cylindrical surface of said first outer cylinder;

n) dispensing a second polymeric resin material into a nip formed between said endless belt structure on said inner cylindrical surface and said nose of said second cylindrical mandrel;

o) moving said second cylindrical mandrel completely into said first outer cylinder while dispensing said second polymeric resin material into said nip, said nose of said second cylindrical mandrel enabling said second polymeric resin material to form a pool in said nip;

p) completely curing said first polymeric resin material and said second polymeric resin material;

q) removing said endless belt structure, now comprising said endless base structure and said completely cured first and second polymeric resin materials, and said second cylindrical mandrel from said first outer cylinder; and r) removing said endless belt structure from said second cylindrical mandrel.

10. The method as claimed in claim 9 further comprising the steps of:

a) providing a cover for said first outer cylinder;

b) providing a vacuum pump for evacuating air through an opening in said cover from the interior of said first outer cylinder; and c) evacuating air from said first outer cylinder while said step of moving said second cylindrical mandrel completely into said first outer cylinder while dispensing said second polymeric resin material into said nip is being carried out.

11. The method as claimed in claim 9 further comprising the step of attaching said endless belt structure about an entrance to said first outer cylinder.

12. The method as claimed in claim 9 further comprising the step of attaching said endless belt structure to a first end and a second end of said first outer cylinder.

13. The method as claimed in claim 12 further comprising the step of placing said endless belt structure under tension between said first and second ends of said first outer cylinder.

14. The method as claimed in claim 9 wherein said first outer cylinder and said second cylindrical mandrel are oriented in a vertical direction.

15. The method as claimed in claim 9 wherein said first outer cylinder and said second cylindrical mandrel are oriented in a horizontal direction and are spun about a horizontal axis while said step of moving said second cylindrical mandrel completely into said first outer cylinder while dispensing said second polymeric resin material into said nip is being carried out.

16. A method for manufacturing a resin-impregnated endless belt structure comprising the steps of:

a) providing an endless base structure for said endless belt structure, said endless base structure having a length measured therearound and a width thereacross, said width being at least equal to that desired for said endless belt structure;

b) providing a first outer cylinder having an inner cylindrical surface, said inner cylindrical surface having a circumference at least equal to said length of said endless base structure and a height at least equal to the width desired for said endless belt structure;

c) disposing said endless base structure on said inner cylindrical surface of said first outer cylinder;

d) providing a first cylindrical mandrel coaxial with said inner cylindrical surface of said first outer cylinder, said first cylindrical mandrel having a smaller radius than said inner cylindrical surface, said first cylindrical mandrel having an inwardly curved nose at an end thereof;

e) moving said nose of said first cylindrical mandrel into said first outer cylinder, said nose of said first cylindrical mandrel providing a converging geometry with said inner cylindrical surface of said first outer cylinder;

f) dispensing a first polymeric resin material into a nip formed between said endless base structure on said inner cylindrical surface and said nose of said first cylindrical mandrel;

g) moving said first cylindrical mandrel completely into said first outer cylinder while dispensing said first polymeric resin material into said nip, said nose of said first cylindrical mandrel forcing said first polymeric resin material into said endless base structure, forcing air out of said endless base structure, and forcing said endless base structure toward said inner cylindrical surface of said first outer cylinder;

h) partially curing said first polymeric resin material;

i) removing said endless belt structure, comprising said endless base structure and said partially cured first polymeric resin material, and said first cylindrical mandrel from said first outer cylinder;

j) removing said endless belt structure from said first cylindrical mandrel;

k) providing a second outer cylinder having an inner cylindrical surface, said inner cylindrical surface of said second outer cylinder having a radius greater than that of said first outer cylinder, said second outer cylinder being coaxial with said first cylindrical mandrel;

l) disposing said endless belt structure within said second outer cylinder;

m) attaching said endless belt structure about an entrance to said second outer cylinder;

n) moving said nose of said first cylindrical mandrel into said endless belt structure within said second outer cylinder;

o) dispensing a second polymeric resin material into a nip formed between the outside of said endless belt structure and said inner cylindrical surface of said second outer cylinder by said nose of said first cylindrical mandrel acting against the inside of said endless belt structure;

p) moving said first cylindrical mandrel completely into said endless belt structure within said second outer cylinder while dispensing said second polymeric resin material into said nip;

q) completely curing said first polymeric resin material and said second polymeric resin material; and r) removing said endless belt structure, now comprising said endless base structure and said completely cured first and second polymeric resin materials, and said first cylindrical mandrel from said second outer cylinder.

17. The method as claimed in claim 16 further comprising the step of removing said endless belt structure from said first cylindrical mandrel.

18. The method as claimed in claim 16 further comprising the steps of:

a) providing a cover for said second outer cylinder;

b) providing a vacuum pump for evacuating air through an opening in said cover from the interior of said second outer cylinder; and c) evacuating air from said second outer cylinder while said step of moving said first cylindrical mandrel completely into said endless belt structure within said second outer cylinder while dispensing said second polymeric resin material into said nip is being carried out.

19. The method as claimed in claim 16 wherein said second outer cylinder and said first cylindrical mandrel are oriented in a vertical direction.

20. The method as claimed in claim 16 wherein said second outer cylinder and said first cylindrical mandrel are oriented in a horizontal direction and are spun about a horizontal axis while said step of moving said first cylindrical mandrel completely into said endless belt structure within said second outer cylinder while dispensing said second polymeric resin material into said nip is being carried out.

21. The method as claimed in claim 16 further comprising the steps of:

a) grinding an outer surface of said endless belt structure to provide said endless belt structure with a uniform thickness and said outer surface with desired surface characteristics; and b) removing said endless belt structure from said first cylindrical mandrel.

22. The method as claimed in claim 16 further comprising the step of cutting grooves into an outer surface of said endless belt structure.

23. The method as claimed in claim 16 further comprising the step of drilling blind holes into an outer surface of said endless belt structure.

24. The method as claimed in claim 16 wherein said inner cylindrical surface of said second outer cylinder has surface features designed to impart corresponding features into said second polymeric resin material.

* * * * *